United States Patent [19]
Noren et al.

[11] Patent Number: 4,943,600
[45] Date of Patent: Jul. 24, 1990

[54] PHOTOCURABLE POLYAMINE-ENE COMPOSITIONS HAVING IMPROVED CURE SPEED

[75] Inventors: Gerry K. Noren, Hoffman Estates; Edward J. Murphy, Arlington Heights, both of Ill.

[73] Assignee: DeSoto, Inc., Des Plaines, Ill.

[21] Appl. No.: 321,148

[22] Filed: Mar. 10, 1989

[51] Int. Cl.$^5$ ...................... C08F 32/06; C08F 232/06
[52] U.S. Cl. ...................................... 522/106; 522/14; 522/90
[58] Field of Search ............................ 522/106, 14, 90

[56] References Cited

U.S. PATENT DOCUMENTS

| | | | |
|---|---|---|---|
| 4,710,523 | 12/1987 | Lechtken et al. | 522/14 |
| 4,721,734 | 1/1988 | Gehlhaus et al. | 522/14 |
| 4,761,435 | 8/1988 | Murphy et al. | 522/106 |

Primary Examiner—Lewis T. Jacobs
Assistant Examiner—Susan Berman
Attorney, Agent, or Firm—Dressler, Goldsmith, Shore, Sutker & Milnamow, Ltd.

[57] ABSTRACT

A photocurable ethylenically unsaturated liquid coating composition consisting essentially of: 1- polyethylenically unsaturated material in which the ethylenically unsaturated groups are polymerizable groups which are not (meth)acrylate groups; 2- a polyamine resin; and 3- an hydroxyalkyl phenone photoinitiator to speed the cure. The photocure rate is also speeded by combining a tertiary amine-functional acrylic copolymer, an allyl-functional resin, and a maleate-functional resin in a weight ratio of about 15-65/5-45/30-70. In preferred practice both expedients are used to maximize the cure speed.

3 Claims, No Drawings

PHOTOCURABLE POLYAMINE-ENE COMPOSITIONS HAVING IMPROVED CURE SPEED

DESCRIPTION

1. Technical Field

This invention relates to photocurable compositions containing polyamine and polyene functionalities which possess improved cure speed as a results of photoinitiator selection. The invention includes combinations of amine resins, allyl-functional polyesters and maleate-functional polyesters which further enhance the cure speed which is obtained.

2. Background Art

Photocurable compositions based on (meth)acrylate-functional materials catalyzed by aryl ketone photoinitiators are well known and cure rapidly when exposed to actinic radiation in or near the ultraviolet range. Unfortunately, (meth)acrylate-functional materials are expensive, odorous, and somewhat toxic and hence the art has long sought to replace them. This has not been possible without sacrificing a great deal of the cure speed, and cure speed is normally so important that those skilled in the art do not wish to sacrifice it.

As a matter of interest, the acrylate-functional materials are generally faster curing than the methacrylate-functional materials, but they shrink more during the cure. Thus, the art will sometimes choose the methacrylate-functional materials because of their superior cured characteristics while sacrificing some of the desired cure speed. However, when the loss of cure speed is excessive, the art will normally not find such loss acceptable.

One of the more interesting alternatives which have been developed is the use of combinations of amine-functional resins and allyl-functional resins (polyenes) which are responsive to actinic radiation in or near the ultraviolet range in the presence of aryl ketone photoinitiators, preferable illustrated by benzophenone. This is disclosed in the commonly assigned U.S. Pat. No. 4,761,435 in the names of Edward J. Murphy and Ronald S. Conti issued Aug. 2, 1988 the disclosure of which is hereby incorporated by reference.

The patented compositions do not cure by the same mechanism as (meth)acrylates, but they provide superior cured properties and avoid the high cost, odorous, and toxic limitations of the (meth)acrylate compositions.

Unfortunately, and while the previously patented photocured products possess better physical properties, they do not cure as rapidly on exposure to the described actinic radiation, and the significance of rapid cure has already been discussed. This invention provides a more rapid cure. The prior materials are also low in solids content (less than about 55% nonvolatile solids) and it is desired to improve the solids content of the compositions.

SUMMARY OF THE INVENTION

In this invention it is surprisingly found that hydroxy or alkoxy-functional acetophenone derivatives, and more particularly hydroxyalkyl phenones, and also benzoyl diaryl phosphine oxides, all of which are known photoinitiators, increase the rapidity of cure of amine-ene compositions of the type described in U.S. Pat. No. 4,761,435 when exposed to appropriate actinic radiation. While benzophenone is not one of the faster photoinitiators for the conventional (meth)acrylate cure, it was previously the fastest photoinitiator available for the different amine-ene cure, suggesting that a diaryl ketone was best adapted for the amine-ene cure. Nonetheless, the photoinitiators specified herein provoke a much faster response. This result presents an unexpected advance in the art, but it is not presently explainable.

We have further found that typical tertiary amine-functional acrylic copolymers, typical allyl-functional resins and typical maleate-functional resins should be used in a weight ratio of about 15-65/5-45/30-70 since this speeds the cure even when ordinary aryl ketone photoinitiators are used, as in U.S. Pat. No. 4,761,435. The faster photocure response rate provided by the above-defined blend of materials will be documented hereinafter using benzophenone, the preferred photoinitiator used in that patent.

More particularly, and excluding everything other than the three resinous components which are specified above, the amine-functional acrylic copolymers should be present in a dry weight ratio of 15% to 65%, the allyl-functional resin should be present in an amount of 5% to 45%, and the maleate-functional resin should be present in an amount of 30% to 70%. In preferred practice the amine-functional acrylic copolymers should be present in a dry weight of about 20% to about 30%, the allyl-functional resin should be present in a dry weight of about 10% to about 20%, and the maleate-functional resin should be present in an amount of about 50% to about 60%, all based on the total weight of these three components.

DETAILED DESCRIPTION OF THE INVENTION

Referring first to the photocurable ethylenically unsaturated liquid coating compositions which respond more effectively to an hydroxyalkyl phenone photoinitiator, these can be broadly described as a blend of: 1— polyethylenically unsaturated material in which the ethylenically unsaturated groups are polymerizable groups which are not (meth)acrylate groups; 2— a polyamine-functional resin; and 3— a photoinitiator of the type previously specified, more particularly an hydroxy or alkoxy-functional acetophenone derivative, preferably an hydroxyalkyl phenone, or a benzoyl diaryl phosphine oxide, as photoinitiator.

While it is possible to select components which are adequately liquid in the absence of inert volatile organic solvent, it is usually necessary to include sufficient inert solvent, like methyl ethyl ketone or butyl acetate, to provide the liquidity required for coating application. Also, some of the inert solvent can be replaced by non-acrylate-functional monoethylenically unsaturated liquid, like dibutyl maleate.

The polyethylenically unsaturated material can be polymeric, oligomeric or monomeric so long as it includes a plurality of ethylenic groups which are not acrylate or methacrylate groups. It is preferred to use relatively low molecular weight (250-3,000) polyester resins, especially those which include maleate or fumarate groups to provide the polymerizable unsaturation. The maleate or fumarate groups are present in the polyester to provide a double bond equivalent weight of less than 700, down to about 145. These can be used alone or in combination with other non-acrylate or methacrylate ethylenically unsaturated liquid.

Other types of ethylenic unsaturation can also be used, either alone or in combination with one another. These are illustrated by allyl, vinyl and styryl unsaturation; allyl unsaturation being preferred among these.

Allyl esters which can be used are illustrated by diallyl maleate and diallyl phthalate. Allyl ethers which can be used are illustrated by trimethylolpropane diallyl ether. Allyl carbamates which can be used are illustrated by the reaction product of two moles of allyl alcohol with one mole of toluene diisocyanate. Allyl carbonates are illustrated by bisallyl diglycol carbonate. Heterocyclic allyls which can be used are illustrated by triallyl cyanurate and triallyl isocyanurate. Allyl amine or diallyl amine adducts of polyepoxide compounds, such as the diglycidyl ether of bisphenol A, are also useful.

Suitable vinyl ethers are diethyleneglycol divinyl ether and triethyleneglycol divinyl ether.

Polyesters derived from maleic anhydride, fumaric acid, cinnamic acid or itaconic acid are suitable. These unsaturated polyesters are illustrated by a polyester of maleic anhydride/phthalic acid/ethylene glycol in molar proportions of 1.6/1.0/2.7.

The various polyunsaturated compounds are useful alone or in combination at levels of 10% to 90%, and preferably at levels of 20% to 60%, based on the total weight of the admixture with the polyamine resin. The preferred proportion will vary depending on the polyamine resin which is employed.

Because of the variation in molecular weight and number of reactive groups which can be encountered, we prefer to specify the ratio of unsaturated functionality to amine functionality, and this, on an equivalent basis, is from 0.5/1 to 15/1, more preferably 3/1 to 6/1.

Any polyamine resin can be used, but it is preferred to employ an amine resin having a plurality of tertiary amine groups. It is presently preferred to employ an acrylic copolymer containing copolymerized tertiary amine-functional monomer such as dimethylaminoethyl acrylate or the corresponding methacrylate, acrylamide or methacrylamide. The corresponding diethylamino compounds as well as the corresponding monomers in which the aminoethyl group is replaced by aminopropyl or aminobutyl, are also useful. These copolymers will broadly contain from 5% to 50% of the amine monomer component, preferably 10% to 40%.

The acrylic copolymers are preferably prepared by polymerization in volatile organic solvent solution to provide the copolymers in organic solvent solution, preferably at 50% to 70% solids content. These solutions are then combined with the remaining components of the composition to provide the admixtures with the polyethylenic component which has been specified previously.

The polyamine resin can be constituted by other resins, such as an adduct of a resinous polyepoxide, illustrated by a diglycidyl ether of bisphenol A having a number average molecular weight of about 390 or 1,000, with an amine having one or more amino hydrogen atoms. Epoxy novolac resins are also useful. When a monosecondary amine, such as diethyl amine or dibutyl amine, is used, the product contains tertiary amine groups. If excess primary amine, like n-butyl amine, is used, then the polyamine resin will contain secondary amine groups which can be used in a post-cure. The molecular weight of the polyepoxide can range from 350 to 5000.

Polyamine resins containing primary amine groups are illustrated by polyoxypropylene derivatives of polyhydric alcohols, such as ethylene glycol, propylene glycol or trimethylol propane, which are terminated with primary amine groups, these being available in commerce from Texaco in Houston, Tex.

As will be evident, the amino hydrogen atom can react with acrylate unsaturation, but it is not reactive with the non acrylate unsaturation used herein, so there is no difficulty connected with the use of polyamine resins in which the amine groups contain reactive amino hydrogen atoms.

The usual actinic radiation which is employed for the photocure is ultraviolet radiation which broadly describes wavelengths ranging from about 200 to about 450 nanometers. Visible light close to this range can also be used in some instances.

The effective level of the photoinitiator ranges from 1% to 20% of the weight of the unsaturated components. More preferably, as with benzophenone, the effective level is from about 2% to about 10%.

The acetophenone derivatives which may be used have the formula:

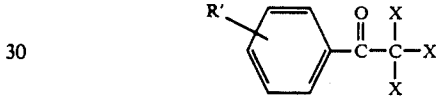

in which R' is an optional hydrocarbon substituent containing from 1 to 10 carbon atoms and which may be alkyl or aryl, e.g., methyl, ethyl, butyl, octyl or phenyl, X is selected from the group consisting of hydroxy, $C_1$–$C_4$ alkoxy, $C_1$–$C_8$ alkyl, cycloalkyl, halogen, and phenyl, or 2 Xs together are cycloalkyl, and at least one X is selected from hydroxy and $C_1$–$C_4$ alkoxy.

All sorts of compounds have the required structure. Thus, the alkoxy groups are preferably methoxy or ethoxy, the alkyl group is preferably methyl or ethyl, the cycloalkyl group is preferably cyclohexyl, and the halogen is preferably chlorine. Only a few of the useful compounds are available in commerce. Thus, one can use the Ciba-Geigy product Irgacure 651 which has the formula:

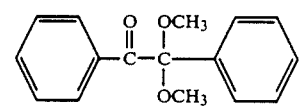

Irgacure 184 is another useful acetophenone derivative, and it has the formula:

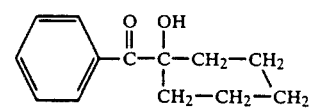

Still another commercially available useful acetophenone derivative is diethoxy acetophenone which has the formula:

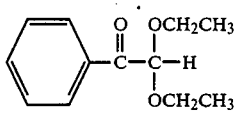

When the photoinitiator is an hydroxy-functional compound, one can define the useful acetophenone derivatives in a somewhat different manner. Thus, the hydroxyalkyl phenones which are preferred herein have the formula:

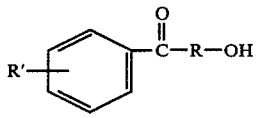

in which R is an alkylene group containing from 2-8 carbon atoms and R' is an optional hydrocarbon substituent containing from 1 to 10 carbon atoms and which may be alkyl or aryl, e.g., methyl, ethyl, butyl, octyl or phenyl.

It is particularly preferred that the hydroxy group be in the 2 position in which case it is preferably a tertiary hydroxy group which defines an hydroxy group carried by a carbon atom which has its remaining three valences connected to other carbon atoms. Particularly preferred compounds within which will be found the commercial material used to obtain the data discussed have the formula:

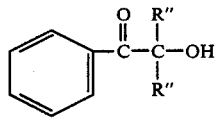

in which R" is an alkyl group containing from 1 to 4 carbon atoms. In the commercial product Darocur 1173, each R" is methyl. This provides a compound which can be described as 2-hydroxy, 2-methyl, 1-phenyl propane 1-one. The corresponding compound in the the term "propane" is replaced by butane or hexane, and these will further illustrate preferred compounds in this invention.

The benzoyl diaryl phosphine oxide photoinitiators which may be used herein have the structure:

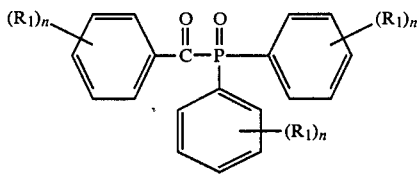

In the above formula, $R_1$ is an optional hydrocarbon substituent containing from 1 to 10 carbon atoms and which may be alkyl or aryl as previously noted, and n is an integar from 1 to 3. In preferred practice, a 2,4,6-trimethyl benzoyl compound is used, and the two aromatic groups connected to the phosphorus atom are phenyl groups. This provides the compound 2,4,6-trimethyl benzoyl diphenyl phosphine oxide which is available from BASF under the trade designation Lucerin.

The photocurable coating compositions primarily contemplated herein are solvent solutions of 50% to 96% solids by weight so as to be capable of being applied as a coating using spray atomization or other known coating method. After solvent flash-off, the deposited films are cured by exposure to ultraviolet radiation, the feature of this invention being that less radiant energy need be applied. Of course, the amount of radiation needed is not only a function of the coating, but its thickness, so more radiation is needed to cure thicker films.

In the preferred compositions of this invention, we combine three different resinous materials in the proportions previously described, and each of these resinous materials will now be described.

The first resinous material is a tertiary amine-functional acrylic resin. These are solvent-soluble copolymers usually produced by polymerization in organic solvent solution and these will usually contain from 5% to 25% of a tertiary amine-functional monoethylenic monomer in combination with other monoethylenic monomers which are non-reactive under the conditions of polymerization except through their signal polymerizable monethylenic unsaturation. These are illustrated by acrylate and methacrylate esters, such as methyl methacrylate, ethyl acrylate, butyl acrylate 2-ethylhexyl acrylate, butyl methacrylate as well as diverse other monoethylenic monomers, such as styrene, vinyl toluene, acrylonitrile, and the like. A proportion of reactive monomers, such as hydroxyalkyl acrylates and methacrylates and monoethylenic acids, such as acrylic or methacrylic acid, can be present in small amount.

The key monomeric component of the acrylic resin is the tertiary amine monomer, and these are illustrated herein by dialkylaminoalkyl acrylates, methacrylates, acrylamides and methacrylamides. Many of these are available in commerce, such as the dimethylaminoethyl acrylate which will be used as illustrative herein. These are normally solid resins and are used herein in solvent solution, typified by 55% non-volatile solids in butyl acetate.

The second resinous material is an allyl-terminated polyester resin. These are simply polyesters made by polyesterifying an excess of polycarboxylic acid with a polyalcohol including a proportion of a monohydric allyl ether, illustrated by ethylene glycol monoallyl ether, butylene glycol monoallyl ether, glyceryl diallyl ether, trimethylol propane diallyl ether, and the like. Suitable polyalcohols are ethylene glycol, diethylene glycol, 1,6-hexane diol, and the like. Triols such as trimethylol propane, and higher functional polyols are useful, especially in small amount, but diols are preferred. The polycarboxylic acids which are used are also usually difunctional, such as succinic acid, adipic acid, azelaic acid, and the like.

Since soluble resins are preferred, the proportions of the reactants is regulated to provide number average molecular weights less than about 5,000 daltons, preferably less than 3,000. The preferred equivalent weight per double bond is in the range of 200 to 600.

The polyesterification reaction is itself conventional and will be illustrated in the examples. In general, the water formed by polyesterification is removed as an azeotrope with an azeotropic solvent, such as xylene. The use of difunctional reactants other than the allyl ether allows that allyl ether to act as a chain-terminator which lowers the molecular weight. The result is an polyallyl-terminated resin which is normally a liquid in the absence of organic solvent.

The third resinous material is a maleate- or fumarate-functional polyester resin of relatively low number average molecular weight, generally less than about 5,000 daltons, and a double bond equivalent weight of from about 145 to about 700 to provide a polyethylenically unsaturated polyester resin which is liquid in the presence of not more than about 20% by weight of non-volatile organic solvent. These polyesters are preferably liquid hydroxy functional linear polyesters having an acid value of less than about 30.

The molecular weight of the polyester is determined by the ratio of hydroxyl to carboxyl groups. The extent of reaction also influences molecular weight, the low acid value products used herein indicating relatively complete reaction. Maleic and fumaric acids are dicarboxylic, and they are usually reacted with a diol, as has been illustrated, to provide the polyester. A ratio in the range of from 1.1:1.0 to 1.4:1.0 is preferred. Polyols containing more than two hydroxy groups can be present in small amounts, such as up to about 25% of total hydroxy functionality of trimethylol propane to provide branching in the otherwise linear polyester.

These unsaturated polyesters are made in conventional fashion by polyesterifying a diol, such as those noted previously, with maleic acid or anhydride, or with fumaric acid. Some monoalkyl maleate or fumarate, such a monobutyl maleate, can be present to help limit the molecular weight of the polyester, but this is not essential.

The term "liquid", and any other term used herein to describe the physical condition of anything, is used in its normal sense to denote the condition at room temperature (about 25° C.).

The reaction is a conventional polyesterification, as illustrated hereinafter, in which the water of esterification is removed as an azeotrope with xylene. It is preferred to use an stoichiometric excess of hydroxy-functional components of at least about 10% and to continue the reaction until the acid number is less than 30.

The invention will be illustrated by the examples and comparisons which follow. In these examples and comparisons, as well as throughout this document, all proportions are by weight, unless otherwise stated.

COMPONENT A

Tertiary Amine-Functional Acrylic Resin

A solution polymerized acrylic resin containing 2-ethylhexyl acrylate (60%), methyl methacrylate (30%) and dimethylaminoethyl acrylate (10%) was prepared at 55% non-volatile solids in butyl acetate.

COMPONENT B

Allyl-Terminated Polyester

An allyl-terminated polyester resin was prepared by heating a mixture of diethylene glycol (29.7%), azelaic acid (53.2%), and trimethylol propane diallyl ether (17.1%) to about 190°-210° C. in the presence of a small amount of xylene. During the reaction, the water formed by polyesterification was removed as an azeotrope with xylene. The reaction is entirely conventional and was continued until an acid value of 14.1 was obtained. The final product was a slightly viscous liquid at 100% non-volatile solids after removal of the xylene.

COMPONENT C

Unsaturated Maleate-Functional Polyester

A polyester resin was prepared by heating a mixture of diethylene glycol (46.8%), maleic anhydride (43.2%), butyl carbitol (10.0%) and a small proportion of water to about 180°-200° C. slowly while removing the water as an azeotrope with xylene. The reaction was continued until an acid value of 17.4 was obtained. The final product was a slightly viscous liquid at 100% non-volatile solids after removal of the xylene.

COATING FORMULATION I

A cloudy blend was obtained by mixing 25.8% of Component A, 14.0% of Component B, 56.8% of Component C and 3.4% of Darocur 1173 (a commercially available hydroxylakyl phenone [2-hydroxypropyl phenone] available from EM Chemicals). The above proportions are based on solids, but some solvent is also present. The blend had a calculated non-volatile solids content of 88.4% and a Gardner-Holdt viscosity at room temperature (25° C.) of G-H. This is one of several coating formulations which were tested, as reported hereinafter, in which this Formulation is identified as Formulation I.

COATING FORMULATION II

A cloudy blend was obtained by mixing 25.8% of Component A, 14.0% of Component B, 56.8% of Component C and 3.4% of benzophenone. The blend had a theoretical non-volatile solids content of 88.4% and a Gardner-Holdt viscosity at room temperature (25° C.) of H. This is the same as Coating Formulation I except that benzophenone is used instead of the hydroxyalkyl phenone. In the tests reported hereinafter, this formulation is identified as Formulation S-X and the remaining Formulations tested were all made in the same way be simple mixing.

As will be apparent, Formulation S-X provides better results than other combinations of the same Components A, B and C using benzophenone as the photoinitiator. However, when the hydroxyalkyl phenone photoinitiator is used, the results are still further greatly improved.

More particularly, a series of coating formulations were prepared having the compositions set forth in the TABLE 1 which follows. The proportions are of solids and take into consideration the 55% solids content of component A.

TABLE 1

| FORMU-LATION | COATING FORMULATIONS | | | |
|---|---|---|---|---|
| | COMP. A | COMP. B | COMP. C | BENZO-PHENONE |
| S-I | 98.0% | — | — | 2.0% |
| S-II | — | 96.2% | — | 3.8% |
| S-III | — | — | 96.2% | 3.8% |
| S-IV | 62.6% | 34.6% | — | 2.8% |
| S-V | 62.6% | — | 34.6% | 2.8% |
| S-VI | — | 48.1% | 48.1% | 3.8% |
| S-VII | 46.2% | 25.4% | 25.4% | 3.0% |
| S-VIII | 76.4% | 10.5% | 10.5% | 2.5% |
| S-IX | 25.8% | 56.8% | 14.0% | 3.4% |
| S-X | 25.8% | 14.0% | 56.8% | 3.4% |
| I | 25.8% | 14.0% | 56.8% | 3.4%* |

*Indicates Darocur 1173 replaced benzophenone.

Drawdowns were made with each of the above formulations on aluminum using a #40 wire wound rod.

THe uncured films were allowed to air dry for at least 30 minutes to allow most of the solvent to evaporate before attempting to cure the films. After exposure to ultraviolet light, the degree of cure was measured by the number of methyl ethyl ketone (MEK) double rubs. The results of exposing the formulations set forth in Table 1 are shown in Table 2 in which the exposure used is set forth and the numbers reported identify MEK double rubs.

TABLE 2

| TESTING OF COATING FORMULATIONS | | | |
|---|---|---|---|
| FORMULATION | 1 J/cm-sq | 2 J/cm-sq | 3 J/cm-sq |
| S-I | — | — | 0 |
| S-II | — | — | 0 |
| S-III | — | — | 3–4 |
| S-IV | — | — | 3 |
| S-V | — | — | 39–40 |
| S-VI | — | — | 15–20 |
| S-VII | — | — | 20 |
| S-VIII | — | — | 8 |
| S-IX | — | — | 20 |
| S-X | 13 | 150–160 | 200 |
| I | 64 | 200 | — |

These results indicate that Formulation S-X is quite superior to the other blends of the same three components with the previously best photoinitiator, benzophenone. It was the only composition showing a significant cure with a 1 J/cm-sq exposure, it provided a strong cure at a 2 J/cm-sq exposure where none of the other compositions were cured, and it fully cured to resist 200 MEK double rubs at a 3 J/cm-sq exposure where none of the other compositions cured well. Typical cures in U.S. Pat. No. 4,781,435 required at least 3.5 J/cm-sq exposure. A full cure using a 3 J/cm-sq exposure represents a reasonably good cure speed for a (meth)acrylate composition.

On the other hand, Formulation I using Darocur 1173 was much better than Formulation S-X, providing a full cure with only 2 J/cm-sq exposure. This represents about as good as one could expect from an acrylate-based composition formulated to provide good cure speed.

What is claimed is:

1. A photocurable ethylenically unsaturated liquid coating composition consisting essentially of from about 20 to 30 weight percent of a tertiary amine-functional acrylic resin, from about 10 to 20 weight percent of an allyl-terminated polyester resin and from about 50 to 60 weight percent of an unsaturated maleate-functional polyester.

2. A photocurable coating composition as recited in claim 1 that further comprises a photoinitiator.

3. A photocurable coating composition as in claim 2 wherein the photoinitiator is benzophenone.

* * * * *